US 8,667,694 B2

(12) United States Patent
Tokunaga et al.

(10) Patent No.: US 8,667,694 B2
(45) Date of Patent: *Mar. 11, 2014

(54) POWER TOOL

(75) Inventors: Manabu Tokunaga, Anjo (JP); Ryu Hashimoto, Anjo (JP)

(73) Assignee: Makita Corporation, Anjo-Shi (JP)

( * ) Notice: Subject to any disclaimer, the term of this patent is extended or adjusted under 35 U.S.C. 154(b) by 293 days.

This patent is subject to a terminal disclaimer.

(21) Appl. No.: 12/996,858

(22) PCT Filed: Jun. 9, 2009

(86) PCT No.: PCT/JP2009/060560
§ 371 (c)(1),
(2), (4) Date: Feb. 17, 2011

(87) PCT Pub. No.: WO2009/151066
PCT Pub. Date: Dec. 17, 2009

(65) Prior Publication Data
US 2011/0154670 A1 Jun. 30, 2011

(30) Foreign Application Priority Data
Jun. 10, 2008 (JP) ................................ 2008-151996

(51) Int. Cl.
*B26B 3/02* (2006.01)
(52) U.S. Cl.
USPC ................. 30/166.3; 30/370; 30/371; 30/374
(58) Field of Classification Search
USPC ........... 30/228, 173, 249, 383, 263, 374–378, 30/166.3, 370, 371; 74/343, 368
See application file for complete search history.

(56) References Cited

U.S. PATENT DOCUMENTS

| 1,396,512 | A | * | 11/1921 | Fergusson ........................ 74/343 |
| 3,713,217 | A | * | 1/1973 | Frederick et al. ............... 30/287 |
| 3,808,904 | A | | 5/1974 | Gotsch et al. |
| 3,858,317 | A | * | 1/1975 | Ford et al. .......................... 30/92 |
| 4,710,071 | A | * | 12/1987 | Koehler et al. ............... 408/133 |
| 5,239,758 | A | * | 8/1993 | Lindell ........................... 30/500 |

(Continued)

FOREIGN PATENT DOCUMENTS

| CN | 1651808 A | 8/2005 |
| CN | 1720123 A | 1/2006 |

(Continued)

OTHER PUBLICATIONS

Jan. 30, 2012 Extended European Search Report issued in European Patent Application No. 09762496.9.

(Continued)

*Primary Examiner* — Omar Flores Sanchez
(74) *Attorney, Agent, or Firm* — Oliff PLC

(57) ABSTRACT

A power tool includes a power source, a speed change mechanism and a tip tool wherein the speed change mechanism has first and second rotating shafts arranged in parallel, a first power transmission passage equipped with a first gear train and a first clutch, and a second power transmission passage equipped with a second gear train and a second clutch. The speed change mechanism is constituted to switch the transmission passage between the first power transmission passage and the second power transmission passage while keeping the first and second gear trains in meshed state by switching the first and second clutches between power transmission state and power interruption state depending on a load applied to the tip tool.

8 Claims, 13 Drawing Sheets

(56) References Cited

U.S. PATENT DOCUMENTS

| | | | | |
|---|---|---|---|---|
| 5,992,257 | A | * | 11/1999 | Nemetz et al. .................. 74/371 |
| 7,854,274 | B2 | * | 12/2010 | Trautner et al. ................. 173/48 |
| 8,167,054 | B2 | * | 5/2012 | Nakashima et al. ............ 173/48 |
| 8,172,004 | B2 | * | 5/2012 | Ho ................................ 173/176 |
| 8,292,001 | B2 | * | 10/2012 | Trautner ......................... 173/48 |
| 2005/0217124 | A1 | | 10/2005 | Fuchs et al. |
| 2006/0090615 | A1 | | 5/2006 | Yamada |
| 2007/0240531 | A1 | | 10/2007 | Endo et al. |

FOREIGN PATENT DOCUMENTS

| | | |
|---|---|---|
| CN | 1762664 A | 4/2006 |
| GB | 2 399 148 B | 2/2005 |
| JP | U-56-54344 | 5/1981 |
| JP | U-62-174151 | 11/1987 |
| JP | B2-01-058031 | 8/1989 |
| JP | A-7-217709 | 8/1995 |
| SU | 210043 A1 | 1/1968 |
| SU | 2084329 C1 | 7/1997 |

OTHER PUBLICATIONS

Dec. 13, 2010 International Preliminary Report on Patentability issued in International Patent Application No. PCT/JP2009/060560 (with translation).

May 15, 2013 Office Action issued in Chinese Patent Application No. 200980121598.7.

May 6, 2013 Decision on Grant issued in Russian Patent Application No. 2010153862/2 (with translation).

* cited by examiner

POWER TOOL

FIELD OF THE INVENTION

The invention relates to a parallel-shaft type speed change mechanism for use in a power tool.

BACKGROUND OF THE INVENTION

Japanese patent publication H01-58031 discloses a power tool having a parallel-shaft type speed change mechanism. This parallel-shaft type speed change mechanism has first and second drive gears having different numbers of teeth and fixed on a drive shaft, and first and second driven gears having different numbers of teeth and mounted on a driven shaft parallel to the drive shaft such that the driven gears are movable in the longitudinal direction. The first and second driven gears to be engaged with the first and second drive gears can be shifted by sliding the first and second driven gears along the driven shaft so that the speed of a motor can be changed to two speeds, or high speed and low speed, and transmitted to the tool bit.

In the above-mentioned known parallel-shaft type speed change mechanism, when the position of the driven gears with respect to the drive gears is changed for speed change, it is difficult to smoothly engage the drive gears with the driven gears. Therefore, further improvement is desired in smoothness of speed changing operation.

SUMMARY OF THE INVENTION

It is, accordingly, an object of the invention to provide a power tool having a parallel-shaft type speed change mechanism with improved smoothness.

In order to solve the above-described problem, a representative power tool according to the invention includes a power source and a speed change mechanism, and a tool bit which is driven via the speed change mechanism by the power source and caused to perform a predetermined operation. The "power tool" in this invention widely includes various kinds of power tools, such as a circular saw or electric cutter for woodworking or metalworking which performs a cutting operation on a workpiece by a rotating saw blade, a sander which performs grinding or polishing operation on a workpiece by a rotating sanding disc, a diamond core drill for drilling a relatively large-diameter hole, and a hedge trimmer for trimming a hedge by reciprocating upper and lower blades in opposite directions.

According to the preferred aspect of the invention, the speed change mechanism is provided to include first and second rotating shafts disposed parallel to each other, and first and second gear trains having different gear ratios and each having a combination of a drive gear and a driven gear as one unit which are engaged with each other and transmit torque of the first rotating shaft to the second rotating shaft. A torque transmission path via the first gear train is defined as a first power transmission path and a torque transmission path via the second gear train is defined as a second power transmission path. The power tool further includes a first clutch which allows and interrupts power transmission on the first power transmission path and a second clutch which allows and interrupts power transmission on the second power transmission path. Further, the power transmission path is switched between the first and second power transmission paths while the first and second gear trains are held engaged, by shifting of the first and second clutches between the power transmission state and the power transmission interrupted state according to a load applied to the tool bit.

The "power source" in this invention typically represents an electric motor, but it also suitably includes motors other than the electric motor, such as an air motor and an engine. Further, the manner in which "the power transmission path is switched between the first and second power transmission paths while the first and second gear trains are held engaged" in this invention represents the manner in which the power transmission path is switched between the first and second power transmission paths while the position of the gears engaged with each other is fixed, or specifically, the manner in which, when one clutch is shifted to the power transmission state, the other clutch is shifted to the power transmission interrupted state, and when one clutch is shifted to the power transmission interrupted state, the other clutch is shifted to the power transmission state. One of the first and second power transmission paths is typically defined as a high-speed low-torque power transmission path and the other as a low-speed high-torque power transmission path.

According to the invention, the power transmission path can be switched between the first and second power transmission paths while the gear trains in engagement are fixed in position. Therefore, speed changing operation can be performed with increased smoothness.

Particularly, in the case of a construction in which gears to be engaged are shifted for speed change by sliding gears along a shaft, like the known speed change mechanism, a rattle may be caused due to a clearance between mating surfaces of the shaft and the gears, so that wear is easily caused and the gears have a problem in durability. Further, during shift of engagement of the gears, on the verge of disengagement of the gears and in the early stage of engagement of the gears, a very small area of a tooth face is subjected to torque, so that a problem in strength, such as chipping and wear of the teeth, arises. Further, when the gears are engaged, noise may also be caused due to interference of the teeth. According to the invention, however, with the construction in which the gears are normally engaged, the above-mentioned problems of the known technique in which the gears to be engaged are shifted can be solved.

Further, the gear ratio (speed reduction ratio) of the first gear train forming a component of the first power transmission path in this invention is different from the gear ratio of the second gear train forming a component of the second power transmission path. Therefore, when, for example, a load applied to the tool bit is low, the operation can be performed at high speed and low torque, for example, by using the first power transmission path having a small gear ratio. On the other hand, when the load applied to the tool bit is high, the operation can be performed at low speed and high torque by using the second power transmission path having a high gear ratio.

According to a further aspect of the invention, one of the first and second clutches comprises a sliding engagement clutch which can shift between the power transmission state and the power transmission interrupted state, and the other comprises a one-way clutch which can transmit rotation only in one direction. The one-way clutch is configured to transmit power when the sliding engagement clutch is shifted to the power transmission interrupted state.

According to this aspect, the power transmission path can be switched by combination of the sliding engagement clutch and the one-way clutch. Therefore, switching of the transmission path from the first power transmission path to the second power transmission path, or speed change, can be achieved by shifting of the sliding engagement clutch between the power transmission state and the power transmission interrupted state. Thus, the rational speed change mechanism can be obtained.

According to a further aspect of the invention, the first rotating shaft is defined as an upstream shaft disposed upstream of an output shaft and the second rotating shaft is defined as the output shaft, and the sliding engagement clutch is disposed on the upstream shaft. Thus, according to this aspect, by the arrangement of the sliding engagement clutch on the upstream shaft which rotates at higher speed and lower torque than the output shaft, the load on the sliding engagement clutch can be reduced. Therefore, such a construction is effective in protecting the clutch or improving the durability of the clutch. Further, in terms of the arrangement of the shafts with respect to the gear housing, generally, an upstream shaft is disposed inward of a final shaft or an output shaft. Therefore, the gear housing can be prevented from increasing in size by disposing the sliding engagement clutch which is larger in the radial direction than the one-way clutch, on the upstream shaft. By such arrangement, when the power tool is a circular saw, the distance from the output shaft (final shaft) to the lower end surface of the gear housing can be reduced, which does not affect the maximum cutting ability.

According to a further aspect of the invention, the first rotating shaft is defined as an upstream shaft disposed upstream of an output shaft and the second rotating shaft is defined as the output shaft, and the one-way clutch is disposed on the output shaft. Generally, a one-way clutch is disposed between a shaft and a gear, and the gear on the output shaft on the speed reduced side has a larger diameter than the gear on the upstream shaft. Therefore, by disposing the one-way clutch on the output shaft, a mounting space for the one-way clutch can be easily secured, so that advantage can be obtained in design.

According to a further aspect of the invention, the power tool includes a power tool body that houses the power source and the speed change mechanism, and a base which is disposed below the power tool body and can be placed on a workpiece. The tool bit comprises a saw blade which is rotationally driven via the speed change mechanism by the power source and thereby cuts the workpiece. According to this aspect, a cutting tool (circular saw) can be provided with a parallel-shaft type speed change mechanism which can more smoothly perform speed changing operation.

According to the invention, smoothness of speed changing operation can be improved within a power tool having a parallel-shaft type speed change mechanism.

BRIEF DESCRIPTION OF THE DRAWINGS

FIG. 11 illustrates the movement of the sliding engagement clutch, in which FIG. 11(A) shows the movement of cams and FIG. 11(B) shows the movement of the torque ring provided as a latching member.

DETAILED DESCRIPTION OF THE REPRESENTATIVE EMBODIMENT OF THE INVENTION

First Embodiment of the Invention

Figure 1:
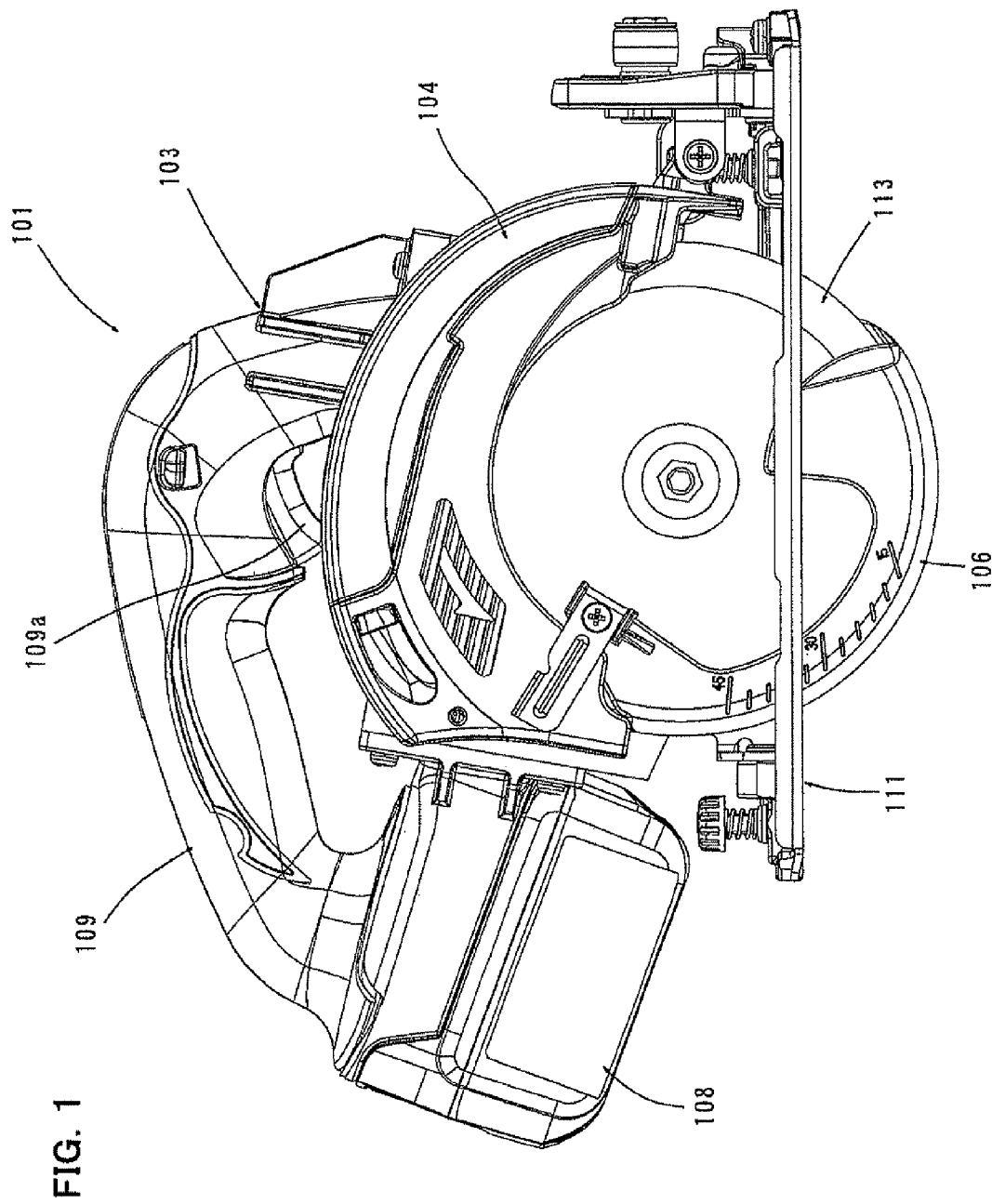
FIG. 1 is a side view showing an entire circular saw according to a first embodiment of the invention.
Figure 2:
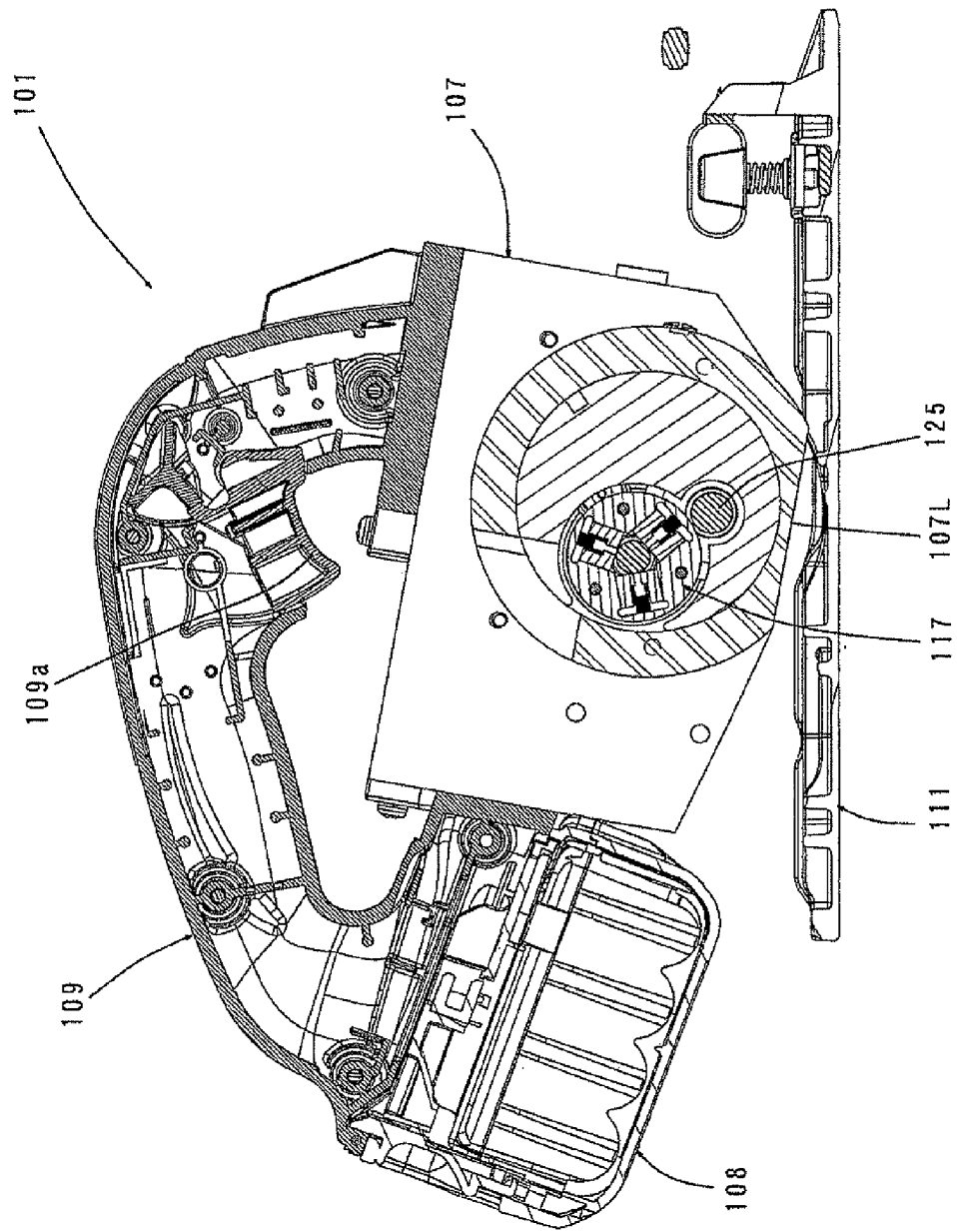
FIG. 2 is a sectional side view of the entire circular saw.
Figure 3:
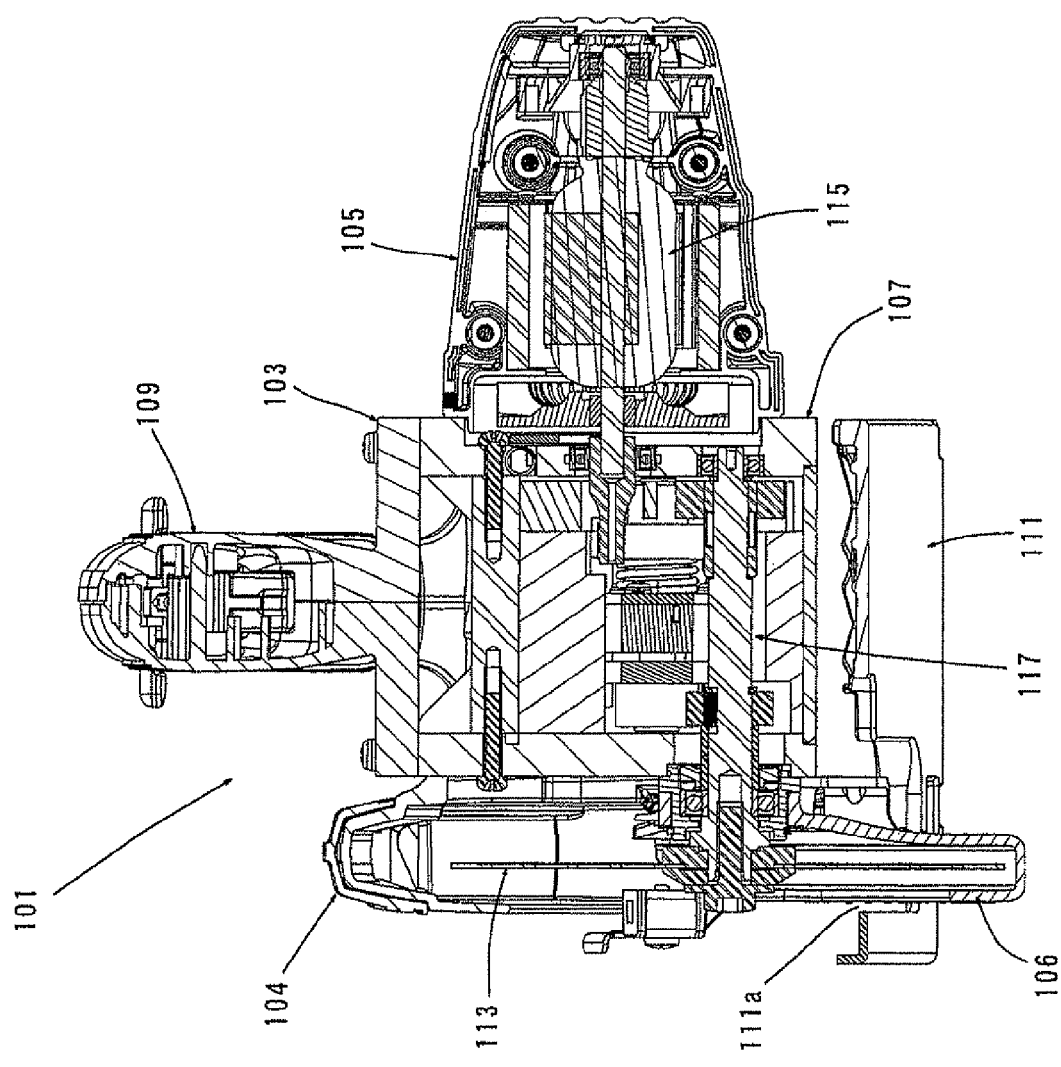
FIG. 3 is a sectional front view of the entire circular saw.

A first embodiment of the invention is now explained with reference to the drawings. A battery-powered circular saw having a battery is now explained as a representative embodiment of the power tool according to the invention. FIG. 1 is a side view showing an entire circular saw 101 according to this embodiment. FIG. 2 is a sectional side view of the entire circular saw 101. FIG. 3 is a sectional front view of the entire circular saw 101. As shown in FIGS. 1 to 3, the circular saw 101 according to this embodiment includes a base 111 which can be placed on a workpiece (not shown) and moved in a cutting direction, and a circular saw body 103 disposed above the base 111. The circular saw body 103 is a feature that corresponds to the "power tool body" according to this invention.

The circular saw body 103 mainly includes a blade case 104 that covers substantially an upper half of a disc-like blade (saw blade) 113 which is rotated in a vertical plane, a motor housing 105 that houses a driving motor 115, a gear housing 107 that houses a speed change mechanism 117, and a handgrip 109 which is held by a user to operate the circular saw 101. The blade 113 and the driving motor 115 are features that correspond to the "tool bit" and the "power source", respectively, according to this invention.

A safety cover 106 is rotatably attached to the blade case 104 and covers a lower half of the blade 113. A lower edge portion of the blade 113 including the safety cover 106 protrudes from the underside of the base 111 through an opening 111a (see FIG. 3) of the base 111. In cutting a workpiece, when the front end (the right end as viewed in FIG. 2) of the base 111 is placed on the workpiece and moved forward (rightward as viewed in FIGS. 1 and 2), the front end of the safety cover 106 is pushed by the workpiece, so that the safety cover 106 retracts and is housed within the blade case 104. The handgrip 109 is connected to an upper portion of the gear housing 107 and has a trigger switch 109a that is depressed by the user to drive the driving motor 115. The blade 113 is rotationally driven via the speed change mechanism 117 when the driving motor 115 is driven. Further, a battery 108 is detachably mounted to the end of the handgrip 109. The driving motor 105 in this embodiment is a rare earth motor with a brake. The battery 108 preferably comprises a lithium ion battery of 42 volts or less.

Figure 4:
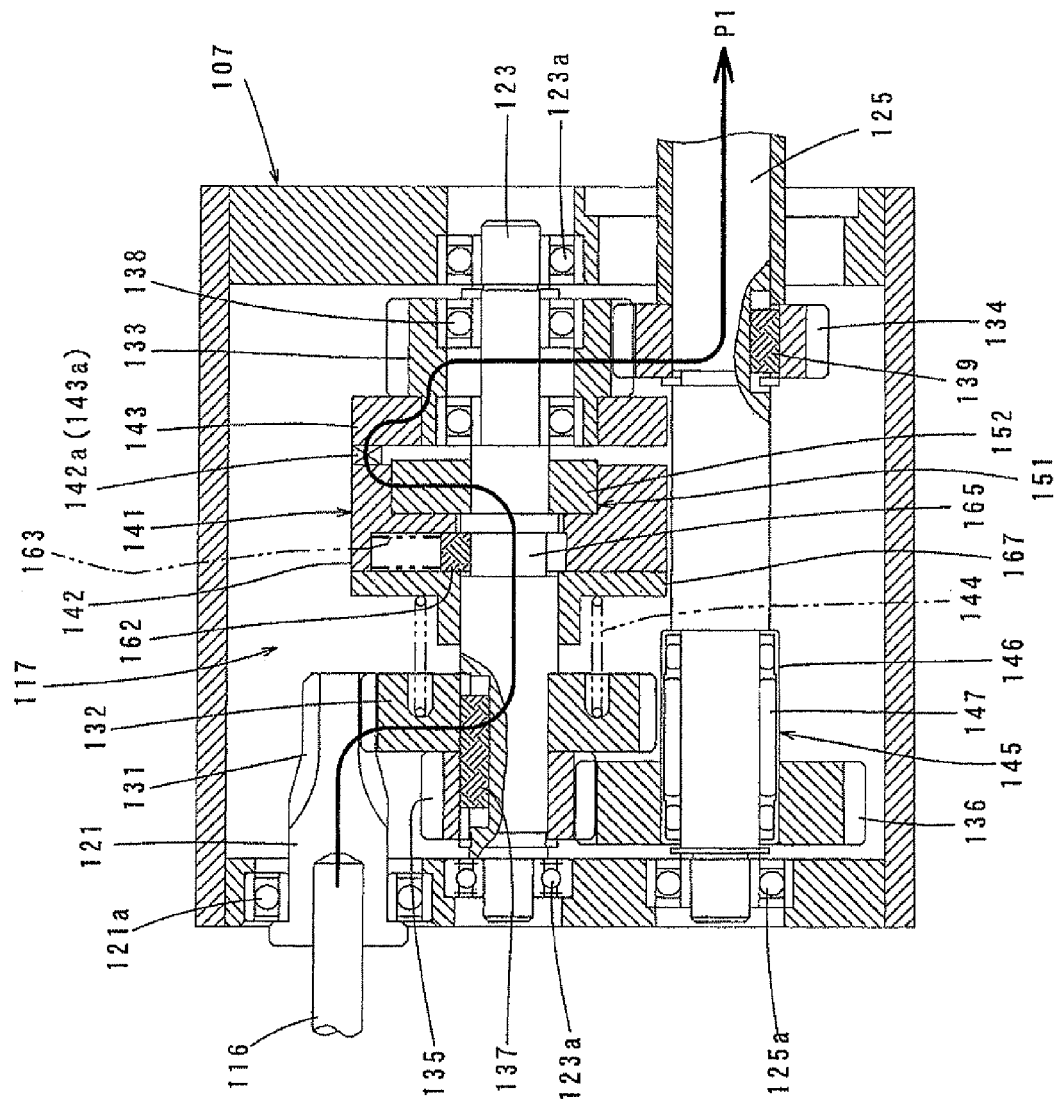
FIG. 4 is a developed sectional view of a parallel three-shaft type speed change mechanism in the state in which a power transmission path is switched to a high-speed low-torque path.
Figure 5:
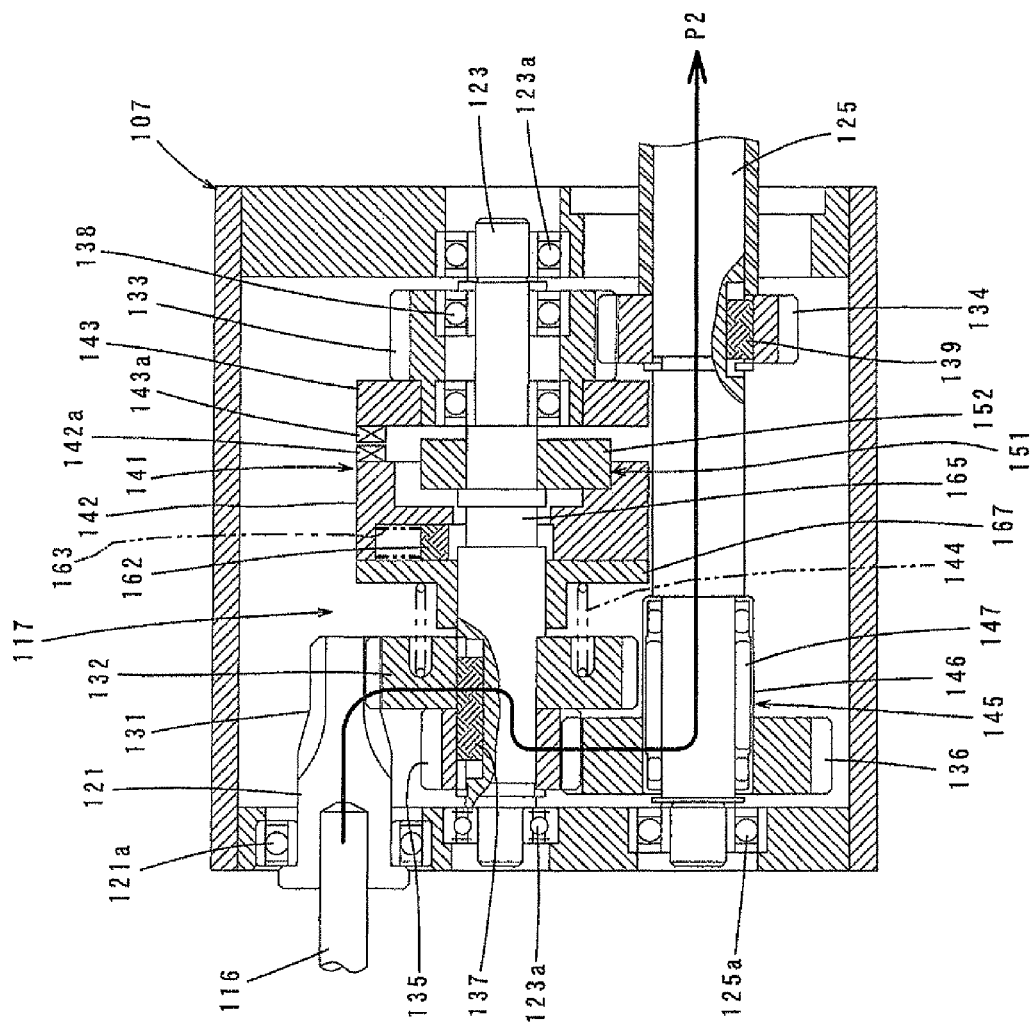
FIG. 5 is a developed sectional view of the parallel three-shaft type speed change mechanism in the state in which the power transmission path is switched to a low-speed high-torque path.

The speed change mechanism 117 is now explained with reference to FIGS. 4 and 5. The speed change mechanism 117 according to this embodiment is of a parallel three-shaft type having three shafts disposed parallel to each other, i.e. an input shaft 121 which is coaxially connected to a motor shaft 116 of the driving motor 115, an output shaft in the form of a blade mounting shaft 125 onto which the blade 113 is fitted, and an intermediate shaft 123 disposed between the input shaft 121 and the blade mounting shaft 125. The speed change mechanism 117 is of the two-stage switching type in which a power transmission path can be automatically switched between a high-speed low-torque path and a low-speed high-torque path according to the magnitude of load applied to the blade 113. The intermediate shaft 123 is a feature that corresponds to the "first rotating shaft" and the "upstream shaft", and the blade mounting shaft 125 corresponds to the "second rotating shaft" and the "output shaft", according to this invention. FIGS. 4 and 5 are developed sectional views of the parallel three-shaft type speed change mechanism 117. FIG. 4 shows the state in which the power transmission path is switched to the high-speed low-torque path, and FIG. 5 shows the state in which the power transmission path is switched to the low-speed high-torque path. In the following description, the blade mounting shaft 125 is referred to as the output shaft.

The speed change mechanism 117 includes a first power transmission path P1 through which torque of the input shaft 121 is transmitted from a pinion gear 131 to the output shaft 125 via a first intermediate gear 132, the intermediate shaft 123, a second intermediate gear 133 and a first driven gear 134, and a second power transmission path P2 through which torque of the input shaft 121 is transmitted from the pinion gear 131 to the output shaft 125 via the first intermediate gear 132, the intermediate shaft 123, a third intermediate gear 135 and a second driven gear 136. The gear ratio (speed reduction ratio) between the second intermediate gear 133 and the first driven gear 134 is designed to be lower than the gear ratio (speed reduction ratio) between the third intermediate gear 135 and the second driven gear 136. Therefore, the first power transmission path P1 forms a high-speed low-torque power transmission path, and the second power transmission path P2 forms a low-speed high-torque power transmission path. The first and second power transmission paths P1, P2 are shown by bold arrowed line. The second intermediate gear 133 and the first driven gear 134 form the "first gear train" according to the invention, and the third intermediate gear 135 and the second driven gear 136 form the "second gear train" according to the invention.

The input shaft 121, the intermediate shaft 123 and the output shaft 125 in the speed change mechanism 117 are rotatably supported by the gear housing 107 via bearings 121a, 123a, 125a, respectively. A drive gear in the form of the pinion gear 131 is integrally formed on the input shaft 121. The first intermediate gear 132 and the third intermediate gear 135 are disposed side by side on one end region (on the driving motor 115 side or the left side as viewed in the drawing) of the intermediate shaft 123 and integrated with the intermediate shaft 123 via a common key 137. The first intermediate gear 132 is normally engaged with the pinion gear 131, and the third intermediate gear 135 is normally engaged with the second driven gear 136 provided on one end region of the output shaft 125. The second intermediate gear 133 is mounted for relative rotation on the other end region (on the blade 113 side or the right side as viewed in the drawing) of the output shaft 125 via a bearing 138 and normally engaged with the first driven gear 134. The first driven gear 134 is disposed on the other end region of the output shaft 125 and integrated with the output shaft 125 via a key 139.

In the circular saw 101 according to this embodiment, in an initial stage of a cutting operation of cutting a workpiece by the blade 113 in which the load applied to the blade 113 is relatively small, the output shaft 125 or the blade 113 is rotationally driven via the high-speed low-torque first power transmission path P1. Thereafter, when the load applied to the blade 113 reaches a predetermined value as the cutting operation proceeds, it is automatically switched to the low-speed high-torque second power transmission path P2. Such switching from the first power transmission path P1 to the second power transmission path P2 is realized by providing a sliding engagement clutch 141 on the intermediate shaft 123 and a one-way clutch 145 on the output shaft 125. The sliding engagement clutch 141 and the one-way clutch 145 are features that correspond to the "first and second clutches", respectively, according to this invention.

Figure 6:
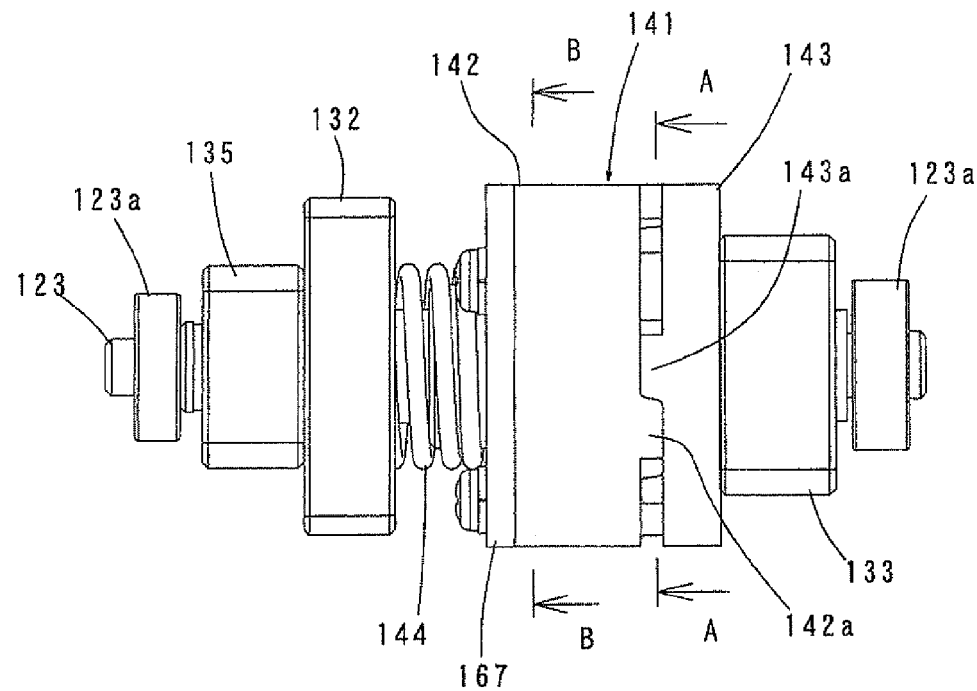
FIG. 6 is an external view of a sliding engagement clutch.
Figure 7:
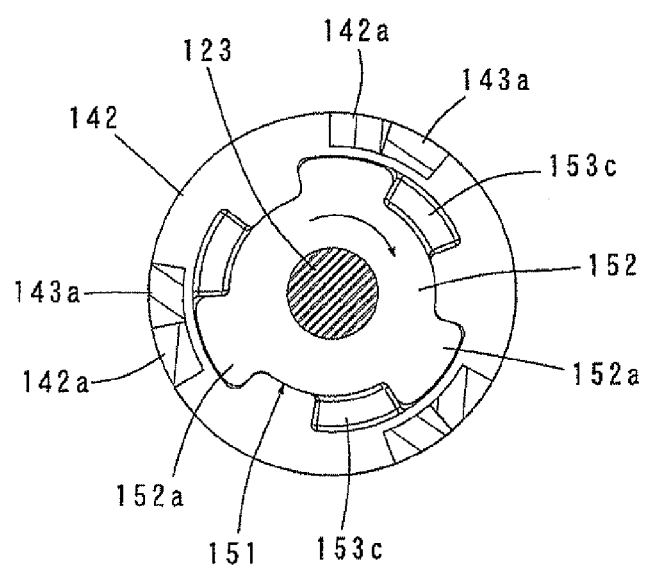
FIG. 7 is a sectional view taken along line A-A in FIG. 6.
Figure 8:
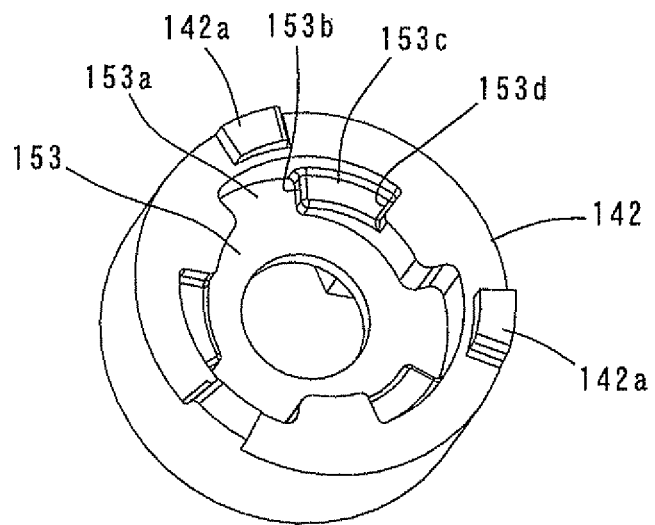
FIG. 8 is a perspective view showing a drive side clutch member in the sliding engagement clutch.
Figure 9:
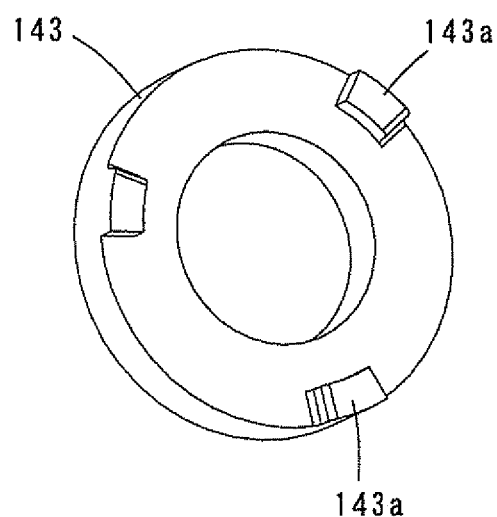
FIG. 9 is a perspective view showing a driven side clutch member in the sliding engagement clutch.
Figure 10:
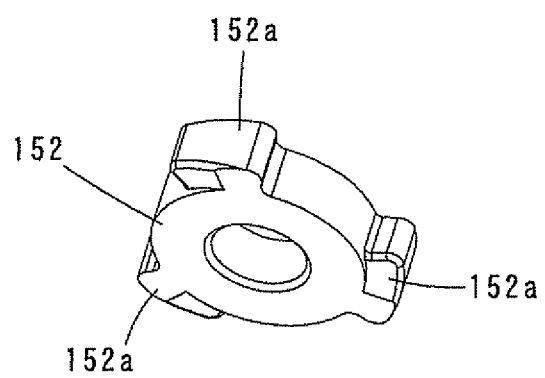
FIG. 10 is a perspective view showing a torque ring in the sliding engagement clutch.

The construction of the sliding engagement clutch 141 is shown in FIGS. 6 to 10 as well as FIGS. 4 and 5. FIG. 6 is an external view of the sliding engagement clutch 141 and FIG. 7 is a sectional view taken along line A-A in FIG. 6, FIG. 8 shows a drive side clutch member 142, FIG. 9 shows a driven side clutch member 143, and FIG. 10 shows a torque ring 152. As shown in FIG. 6, the sliding engagement clutch 141 mainly includes the drive side clutch member 142 and the driven side clutch member 143 which face each other in the axial direction of the intermediate shaft 123, and a clutch spring 144 which presses and biases the drive side clutch member 142 toward the driven side clutch member 143. As shown in FIGS. 8 and 9, the drive side clutch member 142 and the driven side clutch member 143 have a plurality of (for example, three) generally trapezoidal cams 142a, 143a, respectively, in the circumferential direction on the respective sides facing each other. Torque is transmitted when the cams 142a, 143a are engaged with each other (see FIGS. 4 and 6), while the torque transmission is interrupted when the cams 142a, 143a are disengaged from each other (see FIG. 5).

The drive side clutch member 142 is loosely fitted onto the intermediate shaft 123. Specifically, the drive side clutch member 142 is mounted onto the intermediate shaft 123 such that it can slide with respect to the intermediate shaft 123 in the circumferential direction and the axial direction. The drive side clutch member 142 is rotationally driven via a torque transmission member in the form of the torque ring 152 which is press-fitted onto the intermediate shaft 123. As shown in FIG. 10, the torque ring 152 has a plurality of (three) torque transmission parts in the form of protrusions 152a which protrude radially outward and are evenly spaced in the circumferential direction. A housing space 153 is formed in a side of the drive side clutch member 142 on which the cams 142a are formed, and has a shape generally corresponding to the contour of the torque ring 152. The torque ring 152 is housed in the housing space 153 such that the torque ring 152 cannot move in the circumferential direction with respect to the drive side clutch member 142. Each of the protrusions 152a of the torque ring 152 is engaged with an engagement recess 153a (see FIG. 8) of the housing space 153. Therefore, when the torque ring 152 is rotated together with the intermediate shaft 123, the protrusion 152a pushes a radial wall surface of the drive side clutch member 142 which faces the engagement recess 153a, or a torque transmission surface 153b, in the circumferential direction, so that the drive side clutch member 142 rotates together with the torque ring 152. Further, the driven side clutch member 143 is integrated with the second intermediate gear 133.

The drive side clutch member 142 is biased toward a power transmission position in which the cams 142a are engaged with the cams 143a of the driven side clutch member 143, by an elastic member in the form of a clutch spring 144 comprising a compression coil spring. The clutch spring 144 is elastically disposed between the drive side clutch member 142 and the first intermediate gear 132.

Figure 11:
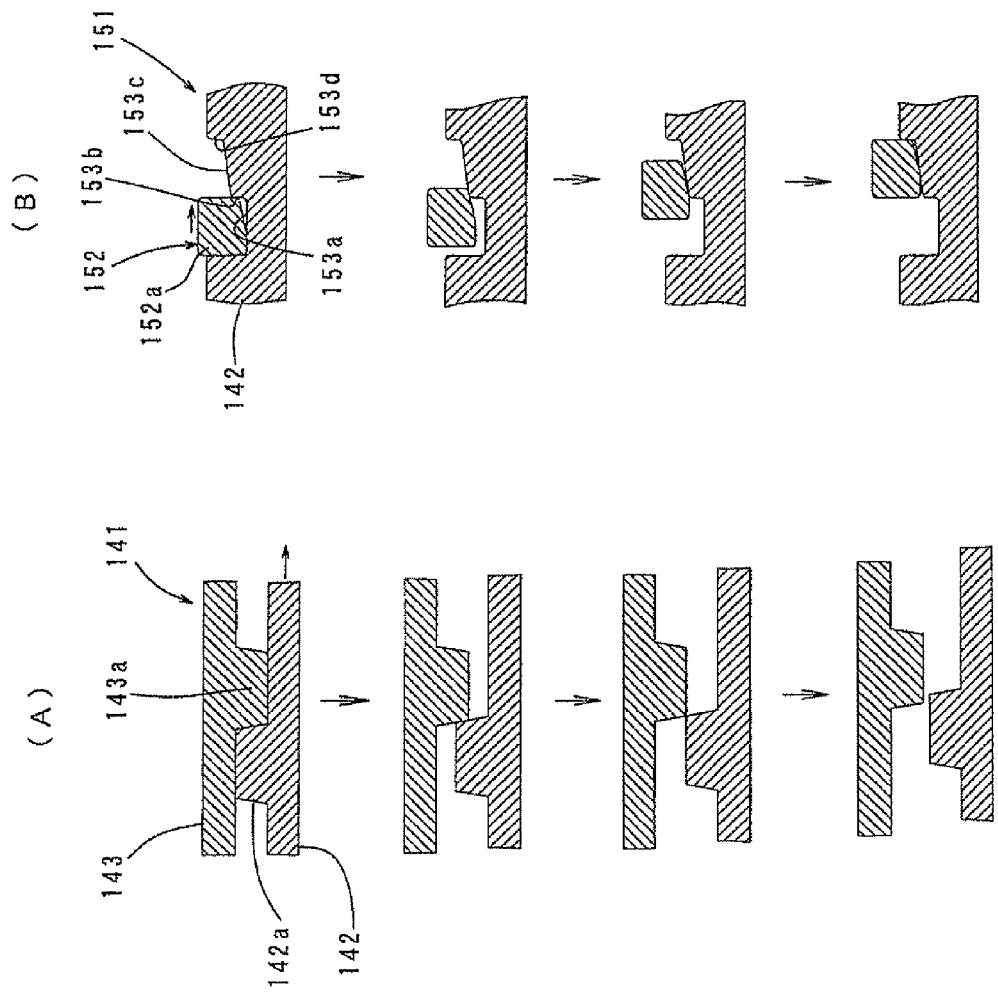

In the state in which the blade 113 is rotationally driven by using the first power transmission path P1, when the blade 113 is acted upon by a load exceeding a predetermined value which overcomes the biasing force of the clutch spring 144, the drive side clutch member 142 is moved (retracted) away from the driven side clutch member 143 by components of a force acting upon inclined surfaces of the cams 142a, 143a in the longitudinal direction. Specifically, the drive side clutch member 142 is moved to a power release position and thus brought into a power transmission interrupted state by disengagement of the cams 142a, 143a. FIG. 11 (A) shows the sliding engagement clutch 141 shifting from the power transmission state to the power transmission interrupted state. When the sliding engagement clutch 141 is shifted to the power transmission interrupted state, the one-way clutch 145 is activated, so that the power transmission path is switched from the high-speed low-torque first power transmission path P1 to the low-speed high-torque second power transmission path P2.

Figure 15:
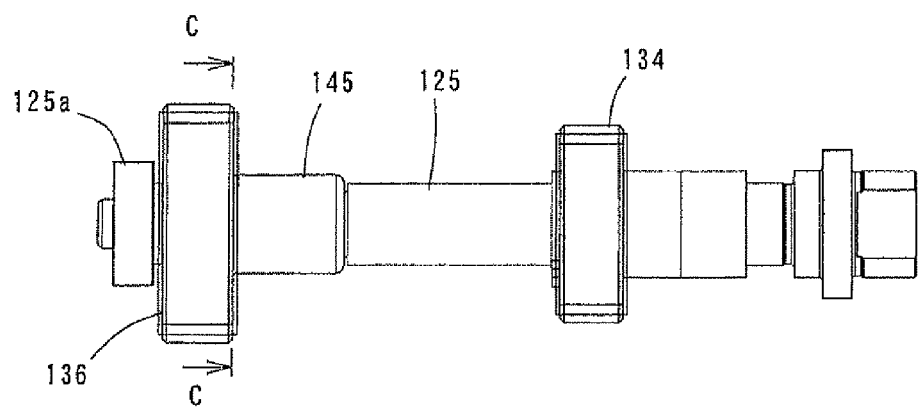
FIG. 15 is a side view showing parts provided on an output shaft.
Figure 16:
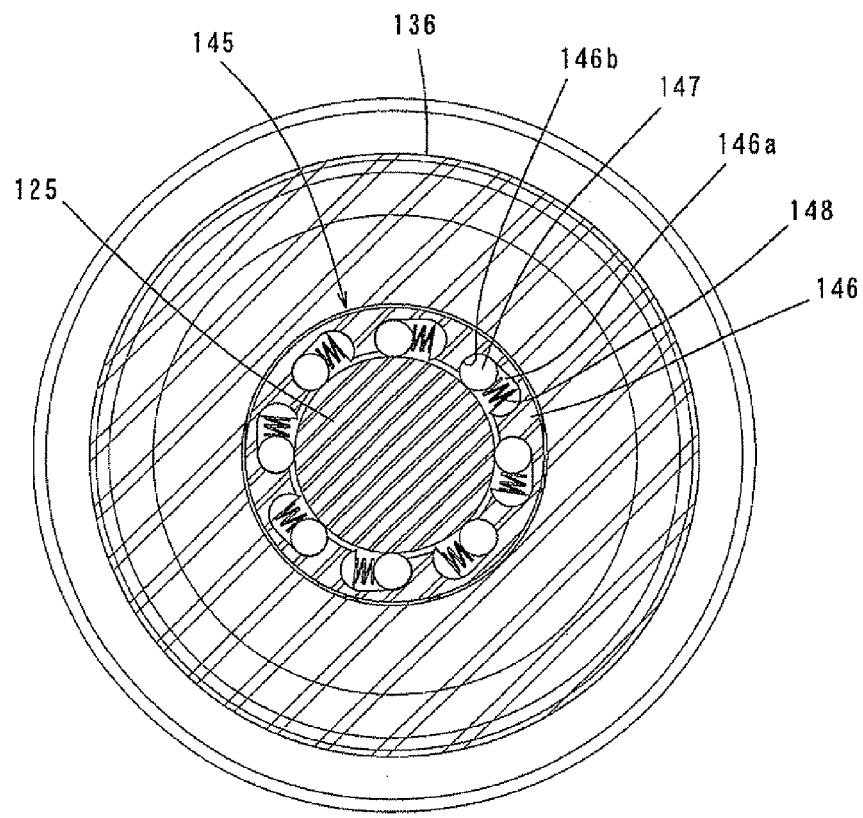
FIG. 16 is a sectional view taken along line C-C in FIG. 15.

The one-way clutch 145 is now explained. The construction of the one-way clutch 145 is shown in FIGS. 15 and 16. FIG. 15 is a side view showing parts provided on the output shaft 125, and FIG. 16 is a sectional view taken along line C-C in FIG. 15. The one-way clutch 145 mainly includes an outer ring 146 that rotates together with the second driven gear 136, a plurality of needle rollers 147 and springs 148 which are disposed between the outer ring 146 and the output shaft 125. The needle rollers 147 are rotatably disposed in cam grooves 146a which are formed in the outer ring 146 at predetermined intervals in the circumferential direction, and biased by the springs 148 toward the position of engagement with cam faces 146b.

Therefore, when the outer ring 146 is rotated clockwise as viewed in FIG. 16 together with the first driven gear 134 with respect to the output shaft 125, the needle rollers 147 are engaged between the associated cam faces 146b and the output shaft 125 by the biasing force of the associated springs 148, and drive the output shaft 125 by a wedging action. This state is shown in FIG. 16. When the output shaft 125 rotates at a higher speed than the outer ring 146, the outer ring 146 rotates counterclockwise as viewed in the drawing with respect to the output shaft 125. Therefore, the needle rollers 147 are disengaged from the associated cam faces 146b, so that the outer ring 146 idles with respect to the output shaft 125. Specifically, when the sliding engagement clutch 141 is in the power transmission state, the outer ring 146 rotates counterclockwise as viewed in the drawing with respect to the output shaft 125, so that the one-way clutch 145 idles and does not transmit power.

With the speed change mechanism 117 constructed as described above, when the driving motor 115 is stopped, the sliding engagement clutch 141 is held such that the drive side clutch member 142 is biased toward the driven side clutch member 143 by the biasing force of the clutch spring 144. Specifically, it is held in the power transmission state in which the cams 142a, 143a of the clutch members 142, 143 are engaged with each other. In this state, when the driving motor 115 is driven to perform a cutting operation on a workpiece, the torque of the driving motor 115 is transmitted to the output shaft 125 via the first power transmission path P1. Specifically, the blade 113 is rotated at high speed and low torque via the pinion gear 131, the first intermediate gear 132, the intermediate shaft 123, the sliding engagement clutch 141, the second intermediate gear 133, the first driven gear 134 and the output shaft 125.

At this time, the outer ring 146 of the one-way clutch 145 is also rotated via the intermediate shaft 123, the third intermediate gear 135 and the second driven gear 136. As described above, however, the outer ring 146 idles because the output shaft 125 rotates at higher speed than the outer ring 146.

As described above, a cutting operation on a workpiece by the blade 113 starts at high speed and low torque via the first power transmission path P1. Thereafter, when the load applied to the blade 113 reaches a switching set value defined by the clutch spring 144 of the sliding engagement clutch 141, the sliding engagement clutch 141 is shifted to the power transmission interrupted state. Specifically, as shown in FIG. 11(A), the drive side clutch member 142 is moved away from the driven side clutch member 143 against the biasing force of the clutch spring 144 by components of the force acting upon the drive side clutch member 142 in the longitudinal direction via the cam faces (inclined surfaces) of the cams 142a, 143a, so that the cams 142a, 143a are disengaged from each other. Thus, the sliding engagement clutch 141 is shifted to the power transmission interrupted state, and when the speed of rotation of the output shaft 125 is reduced to below the speed of rotation of the outer ring 146 of the one-way clutch 145, the needle rollers 147 are engaged between the associated cam faces 146b and the output shaft 125 by the biasing force of the associated springs 148, and drive the output shaft 125 by a wedging action. As a result, the transmission path of the torque of the driving motor 115 is switched from the first power transmission path P1 to the second power transmission path P2, and the blade 113 is rotated at low speed and high torque which are determined by the gear ratio between the pinion gear 131 and the first intermediate gear 132 and the gear ratio between the third intermediate gear 135 and the second driven gear 136.

As described above, according to this embodiment, when the load applied to the blade 113 is low, the cutting operation can be performed on the workpiece at high speed and low torque by using the first power transmission path P1 having a low gear ratio. On the other hand, when the load applied to the blade 113 is high, the cutting operation can be performed on the workpiece at low speed and high torque by using the second power transmission path P2 having a high gear ratio.

With such a construction in which the torque transmission path is automatically switched from the high-speed low-torque first power transmission path P1 to the low-speed high-torque second power transmission path P2 according to the load applied to the blade 113, compared with a circular saw having no speed change mechanism, the driving motor 115 can be prevented from being burnt, and the work rate of cutting on a single charge of the battery 108 can be improved.

Particularly, in this embodiment, switching from the first power transmission path P1 to the second power transmission path P2 can be made in the state in which the gears in the gear trains forming the speed change mechanism 117 are held engaged with each other, or in which the positions of the gears are fixed. Therefore, speed changing operation can be performed with increased smoothness.

Further, according to this embodiment, with the construction in which the sliding engagement clutch 141 is provided on the intermediate shaft 123 and the one-way clutch 145 is provided on the output shaft 125, switching of the transmission path from the first power transmission path P1 to the second power transmission path P2 can be achieved simply by controlling the operation of the sliding engagement clutch 141. Thus, the rational speed change mechanism 117 can be obtained.

Further, in this embodiment, by the arrangement of the sliding engagement clutch 141 on the intermediate shaft 123 which rotates at higher speed and lower torque than the output shaft 125, the load on the sliding engagement clutch 141 can be reduced. Therefore, such a construction is effective in protecting the clutch or improving the durability of the clutch. Further, in terms of the arrangement of the shafts with respect to the gear housing 107, the intermediate shaft 123 is disposed toward the center of the gear housing 107. Therefore, by disposing the sliding engagement clutch 141 which is larger in the radial direction than the one-way clutch 145, on the intermediate shaft 123, the gear housing 107 can be prevented from increasing in size.

The maximum cutting depth of the circular saw 101 (the amount of protrusion of the lower edge portion of the blade 113 from the underside of the base 111) is defined by contact of a maximum cutting depth control part formed on the gear housing 107 with a stopper on the base 111, which is not shown, when the user depresses the handgrip 109 downward from the state shown in FIG. 2 so that the circular saw body 103 is rotated on a pivot (not shown) provided on the front end portion of the base 111. Therefore, for example, if the sliding engagement clutch 141 having a large outside diameter is provided on the output shaft 125, the distance from the center of the output shaft 125 to a lower end surface 107L of the gear housing 107 is increased, which affects the maximum cutting ability. Thus, the maximum cutting ability is degraded. According to this embodiment, however, by providing the sliding engagement clutch 141 on the intermediate shaft 123, the distance from the output shaft 125 to the lower end surface 107L of the gear housing 107 can be decreased, which does not affect the maximum cutting ability.

The one-way clutch 145 is provided on the output shaft 125. The second driven gear 136 on the output shaft 125 on the speed reduced side has a larger diameter than the third intermediate gear 135 on the intermediate shaft 123. Therefore, by disposing the one-way clutch 145 between the output shaft 125 and the second driven gear 136, a mounting space for the one-way clutch 145 can be easily secured, so that the one-way clutch 145 can be easily mounted.

In a construction in which the sliding engagement clutch 141 is automatically shifted according to the load applied to the blade 113, if the load applied to the blade 113 fluctuates around the switching set value defined by the clutch spring 144, the sliding engagement clutch 141 is frequently shifted. Therefore, in order to solve such a problem, the speed change mechanism 117 according to this embodiment is provided with a latching mechanism 151 and a reset mechanism. Once the sliding engagement clutch 141 is shifted to a power transmission interrupted state, the shifted state is retained by the latching mechanism 151. The reset mechanism serves to return it to the initial state or power transmission state after stop of the cutting operation (when the driving motor 115 is stopped).

The latching mechanism 151 is now explained mainly with reference to FIGS. 7, 8, 10 and 11. When the drive side clutch member 142 of the sliding engagement clutch 141 is moved to the power transmission interrupted position, the latching mechanism 151 serves to retain the drive side clutch member 142 in the power transmission interrupted position, or particularly in the position in which the cams 142a of the drive side clutch member 142 are separated (opposed with a clearance) from the cams 143a of the driven side clutch member 143. The latching mechanism 151 mainly includes the above-described torque ring 152.

In the housing space 153 which is formed in the drive side clutch member 142 in order to house the torque ring 152, an inclined surface 153c inclined upward and forward is formed on the drive side clutch member 142 in a forward region (in the direction of rotation) of each of the engagement recesses 153a with which the protrusions 152a of the torque ring 152 are engaged. When the drive side clutch member 142 is moved from the power transmission position to the power transmission interrupted position and thus brought into the power transmission interrupted state, the torque ring 152 is moved out of the housing space 153 and each of the protrusions 152a is moved onto the associated inclined surface 153c. Thus, the cams 142a of the drive side clutch member 142 are separated from the cams 143a of the driven side clutch member 143. This process is shown in FIG. 11. FIG. 11(A) shows the clutch movement, and FIG. 11(B) shows the movement of the torque ring 152 provided as the latching member. For smooth movement of the protrusion 152a of the torque ring 152 onto the inclined surface 153c, the surface of the protrusion 152a which faces the associated inclined surface 153c is configured as an inclined surface or arcuate curved surface.

As shown in FIG. 11 on the top, in the engaged state of the cams 142a, 143a in which the drive side clutch member 142 is placed in the power transmission position, as described above, the protrusion 152a of the torque ring 152 is engaged with the associated torque transmission surface 153b in the engagement recess 153a and held in the torque transmission state. In such a state, when the load applied to the blade 113 exceeds a predetermined value defined by the clutch spring 144 and the drive side clutch member 142 retracts toward the power transmission interrupted position, the torque ring 152 fixed on the intermediate shaft 123 moves in the longitudinal direction, or in a direction of movement out of the housing space 153, with respect to the drive side clutch member 142. Thus, the protrusion 152a of the torque ring 152 is slipped out of the associated engagement recess 153a and disengaged from the associated torque transmission surface 153b. As a result, a difference is caused in the rotation speed between the torque ring 152 and the drive side clutch member 142 to which torque is no longer transmitted. Therefore, the torque ring 152 moves in the circumferential direction with respect to the drive side clutch member 142, and the protrusion 152a of the torque ring 152 climbs on the edge end of the inclined surface 153c (see the second from the top in FIG. 11). By this climbing movement of the protrusion 152a, the drive side clutch member 142 is pushed in the longitudinal direction. Specifically, the drive side clutch member 142 is acted upon by a force in a direction (longitudinal direction) in which the cams 142a are separated from the cams 143a of the driven side clutch member 143. Separation of the cams 142a, 143a is assisted by this force. As a result, the load applied to the cam faces of the cams 142a, 143a is lessened, so that wear of the cams 142a, 143a can be reduced, and thus fluctuations of the switching set value defined by the clutch spring 144 can be minimized.

When the drive side clutch member 142 is further retracted and the cams 142a, 143a are disengaged from each other, the torque ring 152 further moves in the circumferential direction with respect to the drive side clutch member 142. Therefore, the protrusion 152a further climbs onto the inclined surface 153c. Specifically, assistance in separation of the cams 142a, 143a by this climbing movement is continued even after disengagement of the cams 142a, 143a. Therefore, the drive side clutch member 142 is further moved away from the driven side clutch member 143 so that a clearance is created in the longitudinal direction between the cams 142a, 143a. The protrusion 152a climbs on the inclined surface 153c and is engaged with a stopper surface 153d extending upright from the front end of the inclined surface 153c. Thereafter, the torque ring 152 and the drive side clutch member 142 rotate together. This state is shown in FIG. 11(B) on the bottom.

Specifically, when the drive side clutch member 142 is shifted from the power transmission state to the power transmission interrupted state, the torque ring 152 further retracts the drive side clutch member 142 past the power transmission interrupted position in which the cam 142a of the drive side clutch member 142 is disengaged from the cam 143a of the driven side clutch member 143, or to an isolated position in which a predetermined clearance is secured in the longitudinal direction between the cams 142a, 143a, and retains it in this isolated position. Thus, once the sliding engagement clutch 141 is shifted to the power transmission interrupted state, it retains the shifted state regardless of the load applied to the blade 113. Therefore, even if the load applied to the blade 113 fluctuates around the switching set value defined by the clutch spring 144, stable cutting operation can be realized at low speed and high torque via the second power transmission path P2. Further, with the construction in which the drive side clutch member 142 is moved to the isolated position and held in the isolated position so that a certain clearance is secured in the longitudinal direction between the cams 142a, 143a, a reliable power transmission interrupted state can be obtained, and noise and vibration can be prevented from being caused by contact between the cams 142a, 143a.

When the driving motor 115 is stopped after completion of the cutting operation, a brake of the driving motor 115 is activated. Then, the rotation speed of the intermediate shaft 123 is reduced, so that a difference is caused in the rotation speed between the torque ring 152 which rotates together with the intermediate shaft 123 and the drive side clutch member 142 which tends to maintain its rotation speed by inertial torque. Thus, the two members 152, 142 rotate with respect to each other in the circumferential direction, or particularly in the direction in which the protrusion 152a of the torque ring 152 climbs down the inclined surface 153c of the drive side clutch member 142. Therefore, the protrusion 152a is engaged in the engagement recess 153a of the housing space 153. Specifically, the torque ring 152 is returned (reset) to its initial position, so that the power transmission interrupted state held by the sliding engagement clutch 141 is automatically released. Thus, the reset mechanism is formed by utilizing the brake of the driving motor 115 and the inertia of the drive side clutch member 142. When the power transmission interrupted state held by the torque ring 152 is released, the drive side clutch member 142 is moved to the power transmission position by the biasing force of the clutch spring 144, so that it can be made ready for the next cutting operation.

Further, in the case of the speed change mechanism 117 according to this embodiment, at the time of startup of the driving motor 115, when the blade 113 has a large mass and great inertia, the sliding engagement clutch 141 may malfunction, or particularly shift from the power transmission state to the power transmission interrupted state and cause speed change. In order to solve such a problem, the speed change mechanism 117 according to this embodiment is provided with a speed change preventing mechanism 161 for preventing speed change at the time of startup of the motor.

Figure 12:
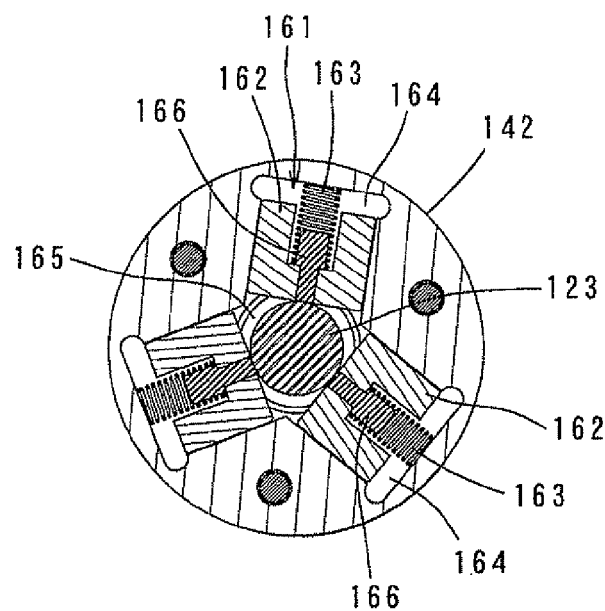
FIG. 12 is a sectional view taken along line B-B in FIG. 6.
Figure 13:
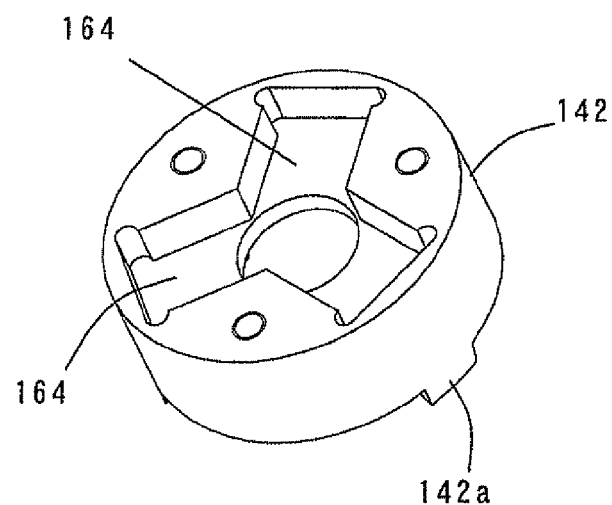
FIG. 13 is a perspective view of the drive side clutch member as viewed from a clutch spring mounting side.
Figure 14:
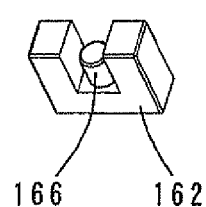
FIG. 14 is a perspective view of a stopper.

The speed change preventing mechanism 161 is now explained mainly with reference to FIGS. 12 to 14. FIG. 12 is a sectional view taken along line B-B in FIG. 6. FIG. 13 is a perspective view of the drive side clutch member 142 as viewed from the clutch spring mounting side. FIG. 14 is a perspective view of a stopper 162. The speed change preventing mechanism 161 according to this embodiment mainly includes a plurality of (for example, three) stoppers 162 and elastic members in the form of compression coil springs 163 which are radially arranged in the drive side clutch member 142.

Stopper housing recesses 164 are formed on the clutch spring mounting side (the side opposite from the cam 142a side) of the drive side clutch member 142 and arranged equiangularly in the circumferential direction. The stoppers 162 and the compression coil springs 163 are disposed within the stopper housing recesses 164 and can move in the radial direction. A radially inner end of each of the stoppers 162 faces the outer circumferential surface of the intermediate shaft 123, and the stopper 162 is pressed and biased toward the intermediate shaft 123 by the associated compression coil spring 163. An annular groove 165 is formed in the circumferential direction in a region of the outer circumferential surface of the intermediate shaft 123 which faces the stoppers 162. When the drive side clutch member 142 is placed in the power transmission position, the radially inner end of each of the stoppers 162 enters the annular groove 165 in the outer circumferential surface of the intermediate shaft 123 from the radial direction and is elastically engaged therewith, so that the drive side clutch member 142 is held in the power transmission position. This state is shown in FIGS. 12 and 4.

Movement of each of the compression coil springs 163 is stabilized by a guide pin 166 provided in each of the stoppers 162. Further, as shown in FIGS. 4 and 5, a cover 167 is mounted on the side of the drive side clutch member 142 in order to cover the stoppers 162 and the compression coil springs 163 disposed within the stopper housing recesses 164. The cover 167 also serves as a spring receiving member for supporting one end of the clutch spring 144.

The speed change preventing mechanism 161 according to this embodiment is constructed as described above. When the driving motor 115 is in the stopped state, the sliding engagement clutch 141 is in the power transmission state. Thus, the stoppers 162 are held in engagement with the annular groove 165 of the intermediate shaft 123. Therefore, at the time of startup of the driving motor 115, the stoppers 162 held in engagement with the annular groove 165 of the intermediate shaft 123 prevent the drive side clutch member 142 from moving in the longitudinal direction, so that the drive side clutch member 142 is held in the power transmission position in which the cams 142a are engaged with the cams 143a of the driven side clutch member 143. In this manner, the sliding engagement clutch 141 can be prevented from malfunctioning at the time of startup of the motor.

When the driving motor 115 is started and the motor speed is increased, however, the stoppers 162 are moved outward against the biasing force of the compression coil spring 163 by centrifugal force acting upon the stoppers 162 which rotate together with the drive side clutch member 142, so that the stoppers 162 are disengaged from the annular groove 165 (see FIG. 5). Thus, the stoppers 162 can no longer prevent the drive side clutch member 142 from moving, so that the drive side clutch member 142 is allowed to shift from the power transmission state to the power transmission interrupted state according to the load applied to the blade 113.

Thus, by provision of the speed change preventing mechanism 161 according to this embodiment, in the circular saw 101 having the blade 113 with great inertia, the speed change mechanism 117 does not cause such a malfunction that it causes speed change by inertia of the blade 113 at the time of startup of the driving motor 115. Therefore, the advantage of the speed change mechanism 117 can be fully utilized. Further, the speed change preventing mechanism 161 is particularly effective not only in the circular saw 101 but in a power tool having a tool bit of a great mass, such as a grinder for grinding and polishing and a diamond core drill for drilling a relatively large-diameter hole.

Figure 17:
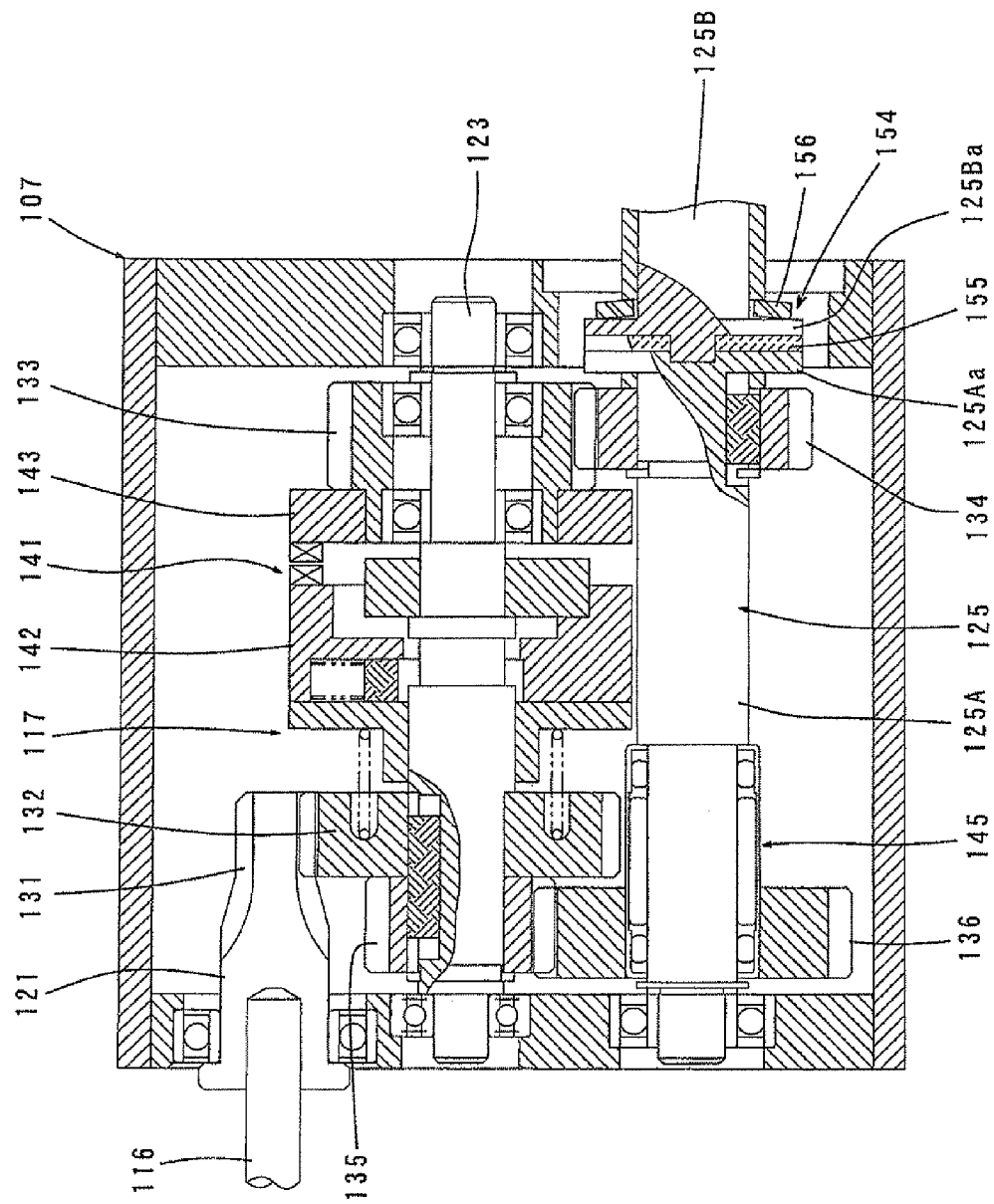
FIG. 17 is a developed sectional view showing a modification.

During cutting operation at low speed and high torque, excessive load may be applied to the blade 113. Therefore, as a measure against such occurrence, a torque limiter 154 is provided on the output shaft 125. FIG. 17 shows the torque limiter 154 mounted on the output shaft 125. The output shaft 125 is divided into two parts, or a proximal shaft part 125A on which the first and second driven gears 134, 136 are mounted, and a distal shaft part 125B on which the blade 113 is mounted, and connected by the torque limiter 154 disposed at the division.

The proximal shaft part 125A and the distal shaft part 125B of the output shaft 125 are coaxially disposed via a circular projection and a circular recess which are loosely fitted together, and have their respective flanges 125Aa, 125Ba which face each other. The torque limiter 154 includes a friction plate 155 disposed between the flange 125Aa of the proximal shaft part 125A and the flange 125Ba of the distal shaft part 125B, and a leaf spring 156 which applies a biasing force in a direction that presses the flanges 125Aa, 125Ba against each other. The maximum transmission torque is defined by the leaf spring 156.

Thus, the maximum transmission torque is controlled by the torque limiter 154 on a final shaft in the form of the output shaft 125. Therefore, during cutting operation, when an excessive load is applied to the blade 113, the friction plate 155 slides with respect to the flanges 125Aa, 125Ba, so that it can cope with the excessive load.

Second Embodiment of the Invention

Figure 18:
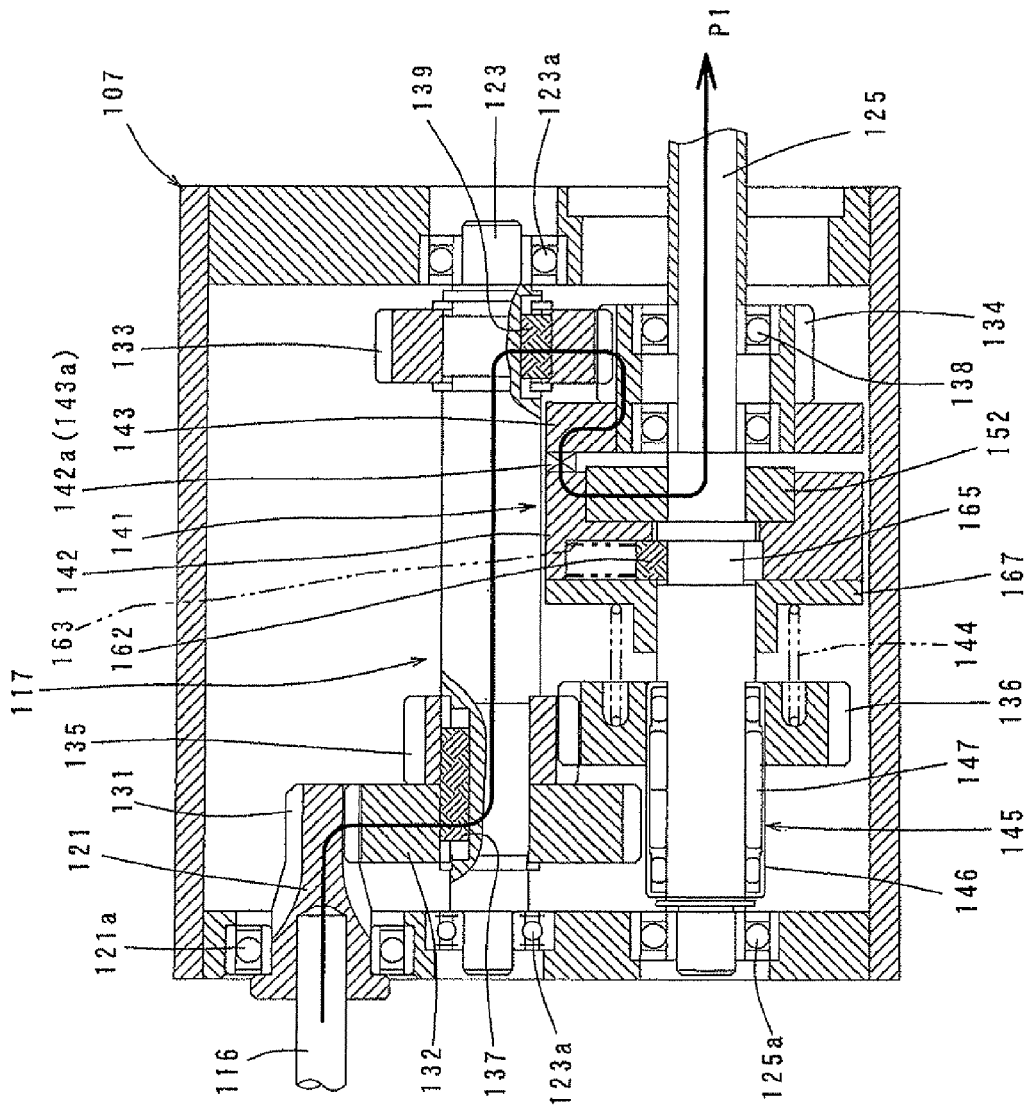
FIG. 18 is a developed sectional view of a parallel three-shaft type speed change mechanism according to a second embodiment of the invention, in the state in which a power transmission path is switched to a high-speed low-torque path.
Figure 19:
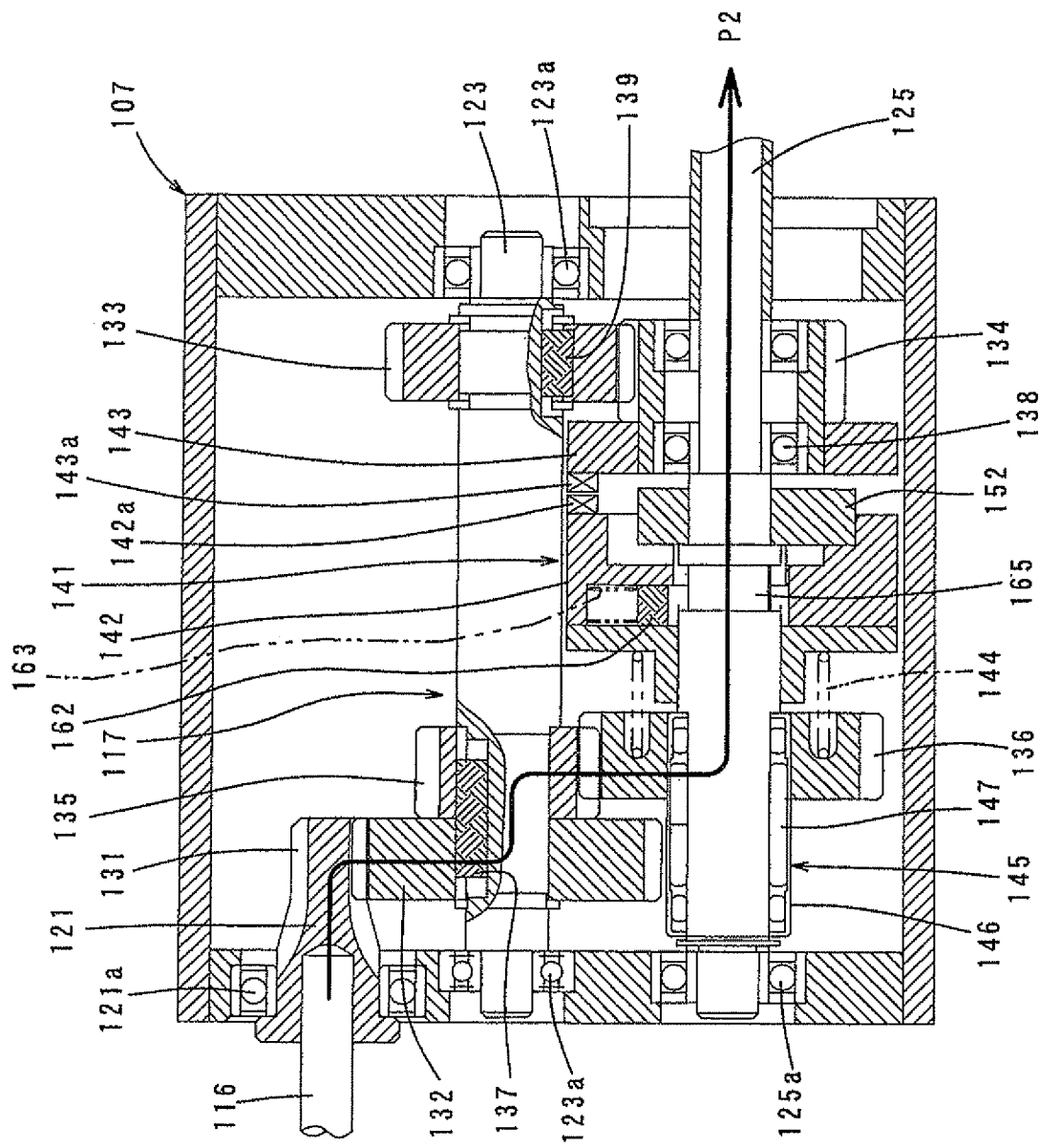
FIG. 19 is also a developed sectional view of the parallel three-shaft type speed change mechanism in the state in which the power transmission path is switched to a low-speed high-torque path.

A second embodiment of the invention is now explained with reference to FIGS. 18 and 19. In this embodiment, the sliding engagement clutch 141 is disposed on the output shaft 125 and effects speed change on the output shaft 125. In the other points, this embodiment has the same construction as the above-described first embodiment. Therefore, components shown in FIGS. 18 and 19 are given like numerals as in the first embodiment and will not be described or briefly described. FIGS. 18 and 19 are developed sectional views showing the construction of the speed change mechanism 117.

The sliding engagement clutch 141 is mounted on the output shaft 125. By this arrangement, the second intermediate gear 133 is fixedly mounted on the intermediate shaft 123 by the key 139, and the first driven gear 134 normally engaged with the second intermediate gear 133 is rotatably supported on the output shaft 125 via the bearing 138.

Further, the sliding engagement clutch 141 mainly includes the drive side clutch member 142, the driven side clutch member 143 and the clutch spring 144. In this point, this embodiment is the same as the above-described first embodiment. In this embodiment, however, the direction of transmission of power is opposite to that in the first embodiment in which the sliding engagement clutch 141 is mounted on the intermediate shaft 123. Specifically, the clutch member 143 which rotates together with the first driven gear 134 is on the drive side, and the clutch member 142 which rotates together with the output shaft 125 via the torque ring 152 is on the driven side. The clutch spring 144 is disposed between the driven side clutch member 142 and the second driven gear 136 to which the one-way clutch 145 is mounted and biases the driven side clutch member 142 toward the drive side clutch member 143.

Therefore, when the load applied to the blade 113 is low, the torque of the driving motor 115 is transmitted to the blade 113 via the first power transmission path P1 which is formed by the pinion gear 131 of the input shaft 121, the first intermediate gear 132, the intermediate shaft 123, the second intermediate gear 133, the first driven gear 134, the sliding engagement clutch 141 and the output shaft 125. Then the blade 113 is rotationally driven at high speed and low torque. This state is shown in FIG. 18.

When a load exceeding a switching set value defined by the clutch spring 144 is applied to the blade 113, the driven side clutch member 142 is moved from the power transmission position to the power transmission interrupted position against the biasing force of the clutch spring 144. Thus, the cams 142a of the driven side clutch member 142 are disengaged from the cams 143a of the drive side clutch member 143. As a result, the torque of the driving motor 115 is transmitted to the blade 113 via the second power transmission path P2 which is formed by the pinion gear 131 of the input shaft 121, the first intermediate gear 132, the intermediate shaft 123, the third intermediate gear 135, the second driven gear 136, the one-way clutch 145 and the output shaft 125. Then the blade 113 is rotated at low speed and high torque. This state is shown in FIG. 19.

As described above, in this embodiment, like in the above-described first embodiment, the power transmission path can be switched from the first power transmission path P1 to the second power transmission path P2 in the state in which the gears in the gear trains forming the speed change mechanism 117 are held engaged with each other, or in which the positions of the gears are fixed. Therefore, speed changing operation can be performed with increased smoothness.

The speed change mechanism 117 according to this embodiment is described as being of a parallel three-shaft type, but it may be of a two-shaft type having two parallel shafts, or an input shaft and an output shaft. Further, it may be of a type in which the one-way clutch 145 is disposed on the intermediate shaft 123 side. Further, in this embodiment, the battery-powered circular saw 101 is described as a representative example of a power tool according to the invention, but it is not limited to this. This invention can be applied to an AC-powered circular saw as well as the battery-powered circular saw, and to a tabletop circular saw and a tabletop slide circular saw which perform a cutting operation on a workpiece placed on a table of a base, as well as the hand-held circular saw as shown in the drawings, and also to a circular saw for woodworking or metalworking. It can also be applied to a cutting tool other than a circular saw, such as an electric cutter, and a cutting tool having a reciprocating tool bit, such as a reciprocating saw and a jigsaw. Moreover, it can be widely applied to various kinds of power tools other than a cutting tool, such as a sander and a grinder which perform grinding or polishing operation on a workpiece by a rotating sanding disc or grinding wheel, a driver and a wrench for tightening operation, various kinds of drills for drilling operation, and a hedge trimmer for trimming a hedge by reciprocating upper and lower blades in opposite directions.

Further, it is effectively applied to a power tool, such as a sander and a diamond core drill, in which a load applied to the tool bit varies in one power tool with variations in the size of the tool bit used or with variations in workpieces.

Further, in this embodiment, the latching mechanism 151 is provided and once the sliding engagement clutch 141 is shifted to a power transmission interrupted state, the shifted state is retained by the latching mechanism 151. It may however be changed to a construction in which the latching mechanism 151 is not provided.

DESCRIPTION OF NUMERALS 101 circular saw (power tool)
103 circular saw body (power tool body)
104 blade case
105 motor housing
106 safety cover
107 gear housing
107L lower end surface
108 battery
109 handgrip
109a trigger
111 base
111a opening
113 blade
115 driving motor (power source)
116 motor shaft
117 speed change mechanism
121 input shaft
121a bearing
123 intermediate shaft (first rotating shaft)
123a bearing
125 output shaft (second rotating shaft)
125a bearing
125A proximal shaft part
125B distal shaft part
125Aa flange
125Ba flange
131 pinion gear
132 first intermediate gear
133 second intermediate gear
134 first driven gear
135 third intermediate gear
136 second driven gear
137 key
138 bearing
139 key
141 sliding engagement clutch (first clutch)
142 drive side clutch member
142a cam
143 driven side clutch member
143a cam
144 clutch spring
145 one-way clutch (second clutch)
146 outer ring
146a cam groove
146b cam face
147 needle roller
148 spring
151 latching mechanism
152 torque ring
152a protrusion
153 housing space
153a engagement recess
153b torque transmission surface
153c inclined surface
153d stopper surface
154 toque limiter
155 friction plate
156 leaf spring
161 speed change preventing mechanism
162 stopper
163 compression coil spring
164 stopper housing recess
165 annular groove
166 guide pin
167 cover

The invention claimed is:

1. A power tool comprising:
a power source;
a speed change mechanism; and
a tool bit which is driven via the speed change mechanism by the power source and caused to perform a predetermined operation,
wherein the speed change mechanism includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft,
wherein a torque transmission path via the first gear train is defined as a first power transmission path and a torque transmission path via the second gear train is defined as a second power transmission path, and further includes a first clutch which allows and interrupts power transmission on the first power transmission path and a second clutch which allows and interrupts power transmission on the second power transmission path, and
the power transmission path is switched between the first and second power transmission paths while the first and second gear trains are held engaged, by shifting of the first and second clutches between a power transmission state and a power transmission interrupted state according to a load applied to the tool bit.

2. The power tool according to claim 1,
wherein one of the first and second clutches comprises a drive side clutch member and a driven side clutch member which are opposed to each other on the first or second rotating shaft and can be engaged with each other, one of the drive side clutch member and the driven side clutch member comprises a sliding engagement clutch which slides in a longitudinal direction between a power transmission position in which the clutch members are placed in the power transmission state by engagement with each other and a power transmission interrupted position in which the clutch members are placed in the power transmission interrupted state by disengagement from each other, and the other of the drive side clutch member and the driven side clutch member comprises a one-way clutch which can transmit rotation only in one direction, the one-way clutch being configured to transmit power when the sliding engagement clutch is shifted to the power transmission interrupted state.

3. The power tool according to claim 2, wherein the first rotating shaft is defined as an upstream shaft disposed upstream of an output shaft and the second rotating shaft is defined as the output shaft, and the sliding engagement clutch is disposed on the upstream shaft.

4. The power tool according to claim 2, wherein the first rotating shaft is defined as an upstream shaft disposed upstream of an output shaft and the second rotating shaft is defined as the output shaft, and the one-way clutch is disposed on the output shaft.

5. The power tool according to claim 1, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

6. The power tool according to claim 2, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

7. The power tool according to claim 3, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

8. The power tool according to claim 4, further comprising a power tool body that houses the power source and the speed change mechanism, and a base which is disposed below the power tool body and can be placed on a workpiece, wherein the tool bit comprises a saw blade which is rotationally driven via the speed change mechanism by the power source and thereby cuts the workpiece.

\* \* \* \* \*